June 3, 1924.

W. A. JOHNSON

FUEL REGISTER

Filed Aug. 18, 1922

1,496,544

INVENTOR
Walter A. Johnson,
BY
Arthur M. Hood,
ATTORNEY

Patented June 3, 1924.                                           1,496,544

UNITED STATES PATENT OFFICE.

WALTER A. JOHNSON, OF LYNN, INDIANA.

FUEL REGISTER.

Application filed August 18, 1922. Serial No. 582,630.

*To all whom it may concern:*

Be it known that I, WALTER A. JOHNSON, a citizen of the United States, residing at Lynn, in the county of Randolph and State of Indiana, have invented a new and useful Fuel Register, of which the following is a specification.

My invention relates to improvements in closure caps for gas tanks of automobiles and the like.

One of the objects of my invention is to provide a closure cap for the fuel tanks of automobiles having means whereby an accurate register of the amount of fuel delivered into the tank may be kept.

For the purpose of disclosing my invention, I have illustrated certain embodiments thereof in the accompanying drawings, in which Fig. 1 is a partial rear view of an automobile showing the manner of applying one embodiment of my invention;

Fig. 5 is a side elevation, partly in section, of a modification illustrated in Fig. 4.

Figure 1:
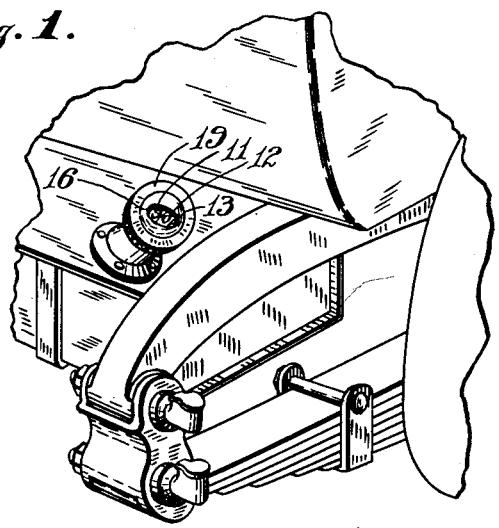
Figure 2:
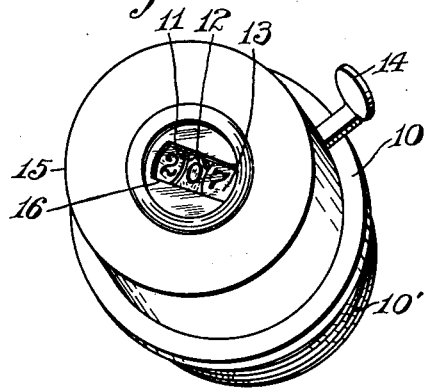
Fig. 2 is a perspective view of one embodiment of my invention.
Figure 3:
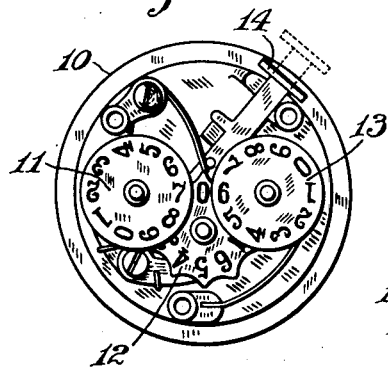
Fig. 3 is a plan view of the same with the register cover removed.

In the embodiment of the invention illustrated in Figs. 2 and 3, I provide a closure cap 10 which is externally screw threaded at 10' to screw thread into the gasoline delivery opening of the tanks of such cars as Ford automobiles and other types of cars wherein the gas tank is more or less inaccessible. On the top of this cap, I provide a registering device having suitable registering or indicating disks 11, 12 and 13, which are operated by a finger member 14 projecting from the side of the register. This registering device is provided with a cover 15 having a sight opening 16 suitably closed by a glass or other cover, through which the numbers of the register may be read.

Figure 4:
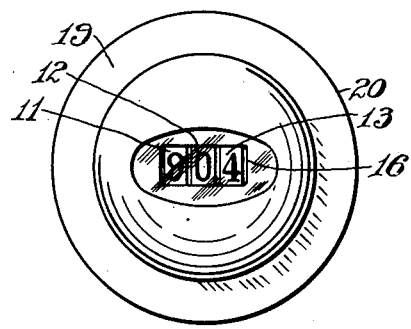
Fig. 4 is a plan view of a modification of my invention.
Figure 6:
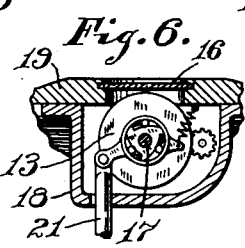
Fig. 6 is a detailed section on line 6—6 of Fig. 5.

In Figs. 4 to 6 I have illustrated a modified form of register wherein the dial, or indicating wheels, are mounted on a suitable shaft 17, arranged in the housing 18 on the under face of the cap 19. The annular flange 20 of this cap is internally screw threaded to engage with the filling nozzle of an automobile gas tank. The operating stem 21 of this type of device extends vertically and when the closure cap is in position, is hidden from view so that it will not be operated by unauthorized persons.

In the operation of either of the forms when the cap is removed for the purpose of filling the tank, the operator may indicate, by operating the register stem, the number of gallons delivered into the tank and in this manner keep an accurate account over an extended period of time the amount of gasoline used in his automobile.

I claim as my invention:

As a new article of manufacture, a cap or closure for the delivery opening of an automobile gas tank having a number registering apparatus the members of which are visible from the exterior of the cap, and provided with an operating stem arranged on the under side of the cap, whereby when the cap is placed in position, the operating stem is completely enclosed.

In witness whereof, I have hereunto set my hand at Lynn, Indiana, this 11 day of August, A. D. one thousand nine hundred and twenty two.

WALTER A. JOHNSON.